May 9, 1961  G. M. DICK  2,983,291
FEED CONVEYOR FOR A LOG DEBARKER

Filed Jan. 22, 1957  3 Sheets-Sheet 1

INVENTOR
GEORGE M. DICK
BY
HIS ATTORNEY

May 9, 1961 G. M. DICK 2,983,291
FEED CONVEYOR FOR A LOG DEBARKER
Filed Jan. 22, 1957 3 Sheets-Sheet 2

INVENTOR
*GEORGE M. DICK*
BY
HIS ATTORNEY

May 9, 1961  G. M. DICK  2,983,291
FEED CONVEYOR FOR A LOG DEBARKER
Filed Jan. 22, 1957  3 Sheets-Sheet 3

INVENTOR
GEORGE M. DICK
BY
HIS ATTORNEY

United States Patent Office 2,983,291
Patented May 9, 1961

2,983,291

FEED CONVEYOR FOR A LOG DEBARKER

George M. Dick, Sherbrooke, Quebec, Canada, assignor to Canadian Ingersoll-Rand Co., Ltd., Montreal, Quebec, Canada, a corporation of Canada Filed Jan. 22, 1957, Ser. No. 635,241

5 Claims. (Cl. 144—242)

This invention relates to log debarkers, and more particularly to log debarkers of the type having rotating cutters for stripping bark from logs fed therethrough.

One object of this invention is to provide automatic centering of the log relative to the cutting or debarking mechanism as the log is fed through the machine.

Another object is to provide a feeding mechanism adapted to positively feed the log into the debarking mechanism without injuring the wood of the log beneath the bark.

Another object is to provide a feeding mechanism for holding the log for movement along a substantially straight line and for preventing oscillation of the log around a point in its longitudinal axis because of force applied to the log by the debarking mechanism.

Still another object of the invention is to provide a debarking mechanism for the debarking machine which automatically releases at least some of the cutters whenever the machine operation is halted.

A further object is to provide such a cutter mechanism in which the cutters are automatically forced into cutting contact with the log whenever the machine is started.

Figure 1:
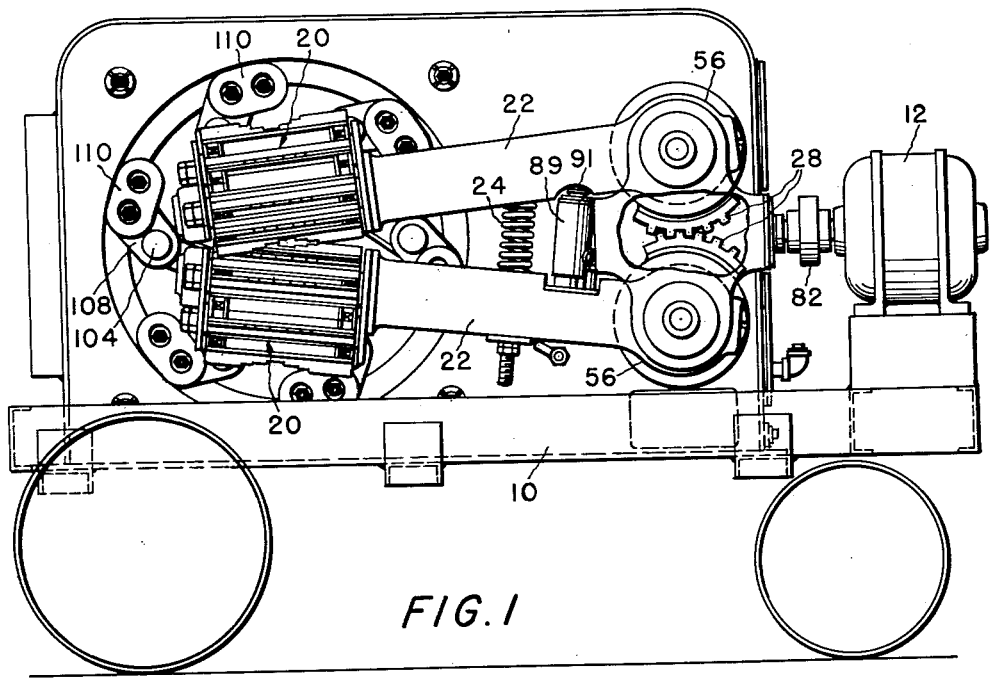
Figure 2:
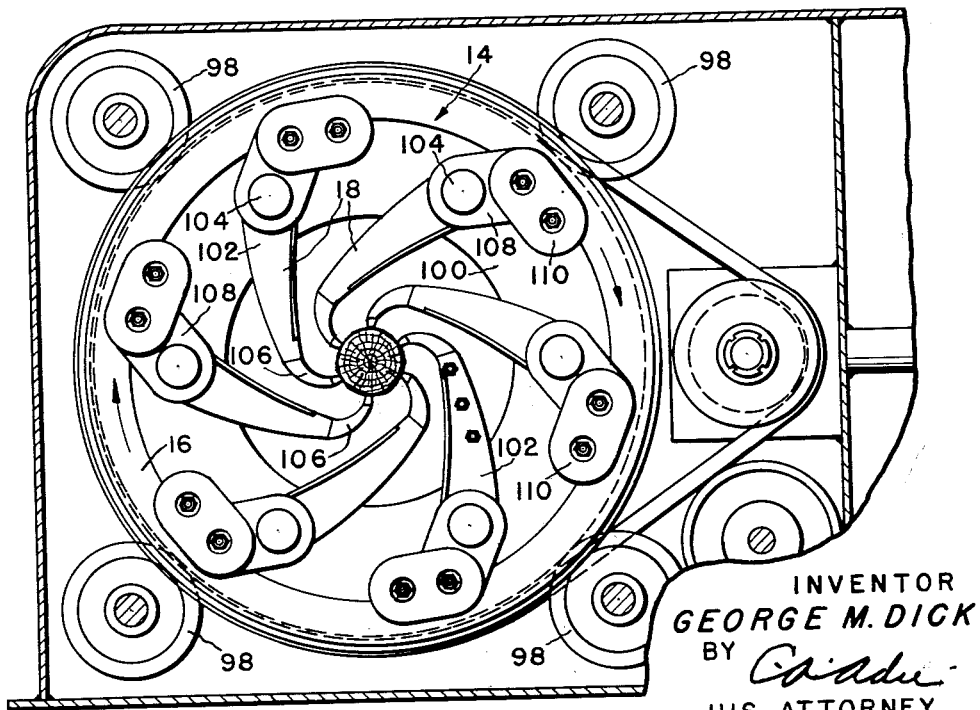
Figure 3:
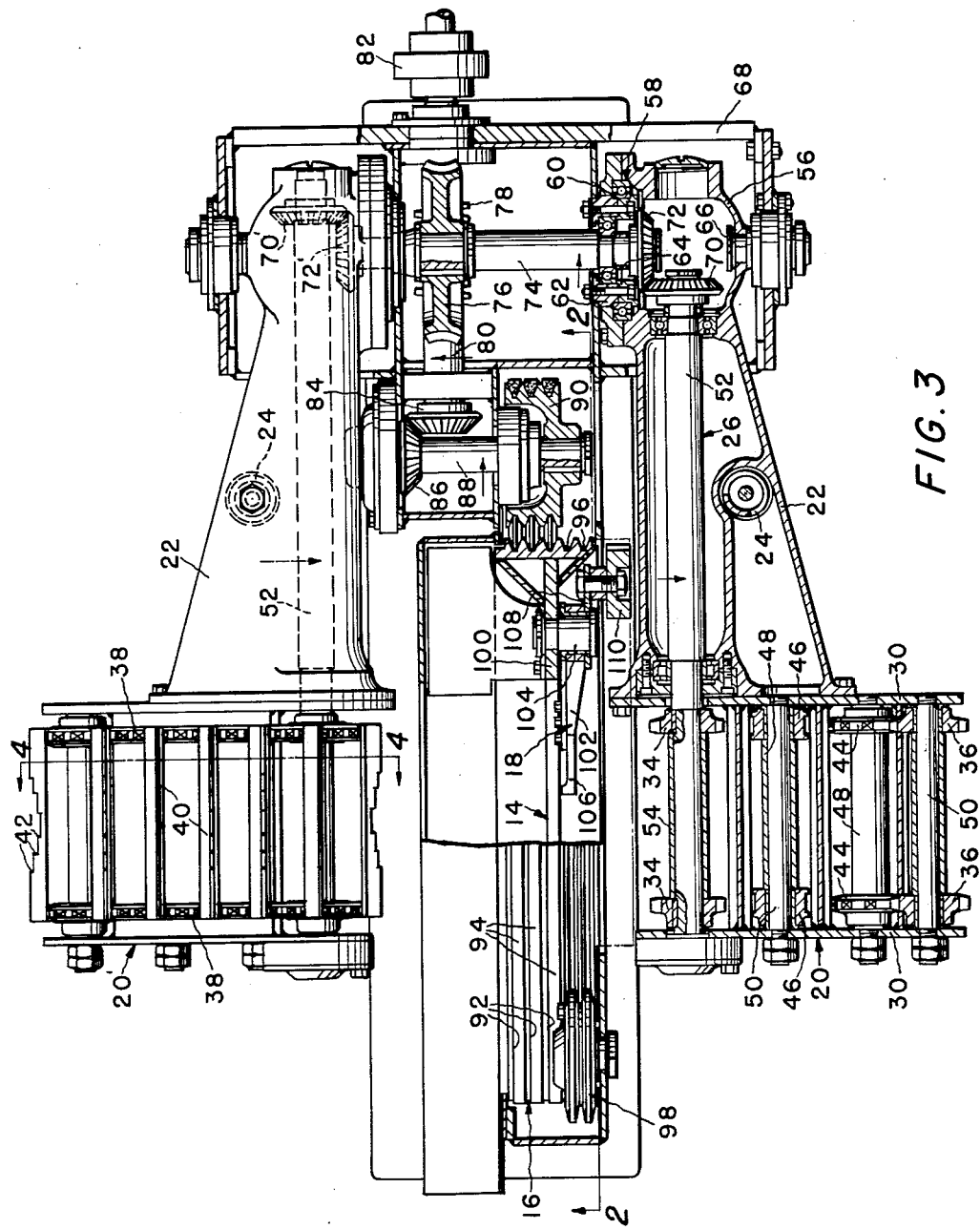
Figure 4:
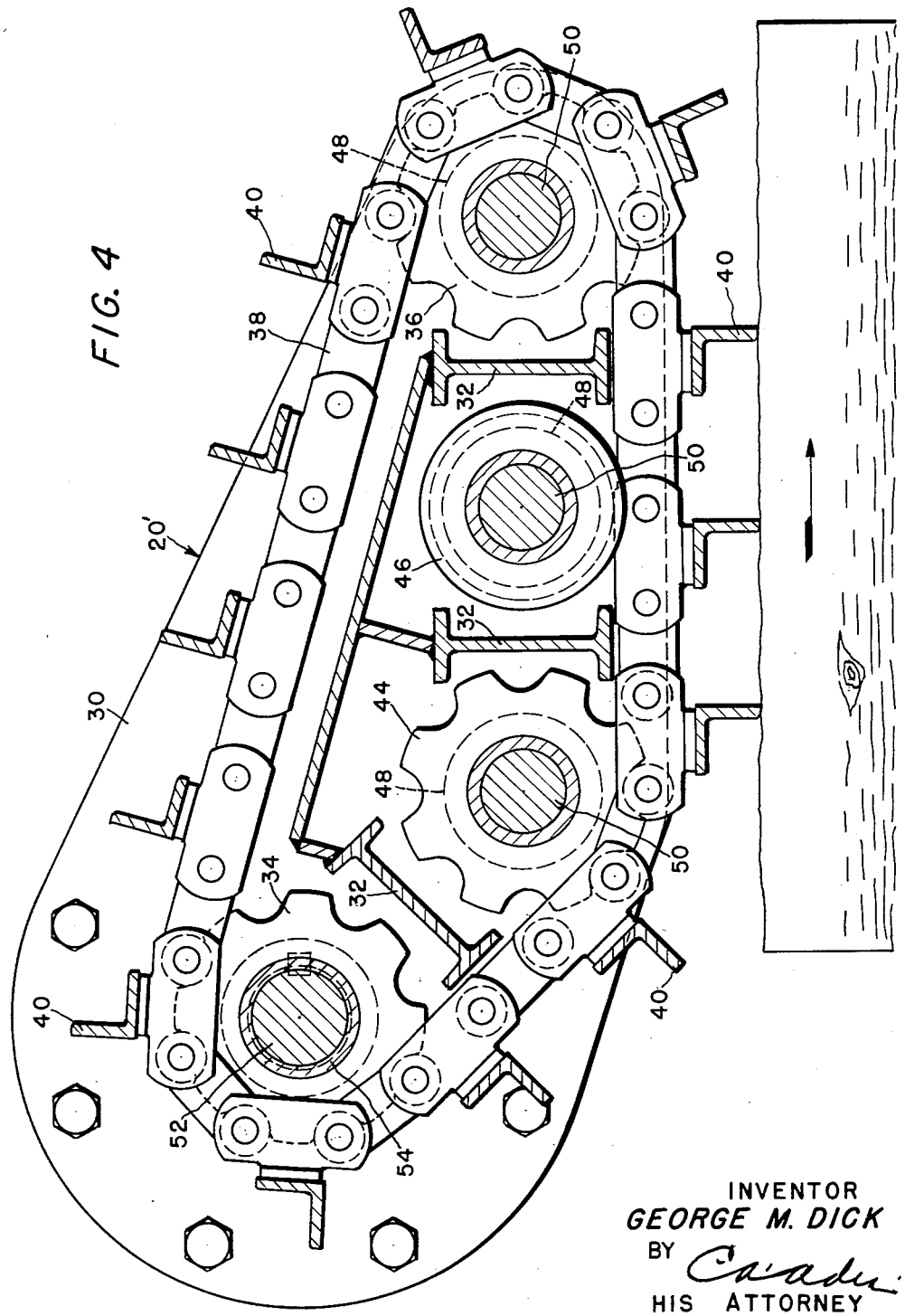

Other objects will become apparent from the following description and drawings, in which:

Figure 1 is an inlet side view of a preferred form of the debarker machine, a portion of a frame extension being broken away to show a gear connection between supporting arms for upper and lower log-feeding elements, Fig. 2 is a vertical, enlarged scale, cross-sectional view of Fig. 3 taken along the line 2—2 looking in the direction of the arrows and shows the debarking mechanism, Fig. 3 is an enlarged scale top view, partially in section, of the debarking machine shown in Fig. 1, and Fig. 4 is a further enlarged scale vertical cross-sectional view of Fig. 3 taken along the line 4—4 looking in the direction of the arrows and shows the construction of one of the conveyors of the feeding mechanism.

Referring to Fig. 1 of the drawings, the log-debarking mechanism is shown as comprising, in general, a wheel-supported frame 10 on which is mounted a motor 12 connected to rotate a debarking mechanism 14 comprising a roller-mounted tubular frame 16 on which are pivotally mounted debarking cutters 18 adapted to strip bark from the log (see Fig. 2). The log to be debarked is fed into and guided through the debarking mechanism by a pair of feed conveyors 20 mounted on arms 22 pivotally connected to the frame 10. A spring 24 is connected to constantly urge the conveyors 20 into firm engagement with the log, and at least one of the feed conveyors includes a driving connection 26 (Fig. 3) with the motor 12 for driving the feed conveyor to feed the log into the debarking mechanism 14. The arms 22 are additionally provided with means for transmitting pivotal movement of one arm to the other so as to insure that the center of the log is maintained relatively constant with relation to the debarking mechanism regardless of any irregularities in the form of the log. The means shown is in the form of a gear connection 28. A similar set of conveyors 20' are mounted on the discharge side of the cutter to guide a log through and cut off the cutter mechanism.

Referring now in greater detail to the construction of the form of the debarking machine shown, all four of the feed conveyors 20 and 20' are substantially identical in construction, as are the supporting arms 22. Accordingly only one feed conveyor and associated arm will be described in detail.

The feed conveyor shown in Figs. 3 and 4 is constructed of a pair of plates 30 held in spaced parallel relation by bracing 32. Mounted between and at opposite ends of the plates 30 are spaced pairs of driving sprockets 34 and idler sprockets 36 drivingly engaging a pair of parallel, endless link chains 38 on which are mounted log-gripping members 40. The particular gripping members shown are in the form of angle irons mounted transversely between, and in spaced parallelism around, the chains 38, with one end of each member 40 being mounted on the link of one chain and the other end mounted on the opposite and corresponding link of the other chain.

It is to be noted that each member 40 is curved inwardly from its ends towards its center relative to the log engaged thereby so as to provide a surface corresponding roughly to the shape of the log. It is to be noted further that this curved form is obtained in a step fashion such that a series of corners 42 are formed which dig into and positively grip the bark of the log.

Experience has shown that with this form of the log-gripping member, not only is the log firmly gripped without destruction or splintering of the wood of the log beneath the bark, but additionally due to the curved form, the feed conveyor is particularly adapted to handle logs of varying diameter and maintain the log in substantially the center of the feed conveyor relative to its sides thereby insuring proper sidewise, or horizontal, centering of the log in the debarking mechanism.

Referring to Fig. 4 it will be noted that viewed from the side each feed conveyor is roughly oblong in shape with its principal axis located substantially parallel to the path of movement of a log moving along the conveyor. In this way a relatively long log-contacting length of the conveyor is presented to the log so that the log is firmly engaged by the conveyor for feeding the log into the debarking mechanism. For example in Fig. 4 it is illustrated that at least three of the gripping members 40 are in contact with the log at all times. Additionally the log is gripped along its length so as to prevent any oscillation of the log about its longitudinal axis as the result of rotative forces applied to the log by the debarking mechanism.

While the form shown of the feed conveyor of the invention is of the endless belt type, it is to be understood that insofar as gripping of the log at axially displaced areas or points is concerned, this can be accomplished by the use of suitable rolling elements which are displaced relative to each other in the axial direction of a log gripped in the feed.

In order to provide a feed conveyor which is automatically positioned when the log is fed thereinto, the lead-in part of the feed conveyor is inclined relative to the longitudinal axis of the log. In furtherance of this end an additional pair of idler sprockets 44 are provided adjacent the lead-in-end sprockets (sprocket 34 in Fig. 4) but positioned nearer the log than such lead-in sprockets and in the same horizontal plane as the discharge-end sprockets (sprocket 36 in Fig. 4). A pair of support rollers 46 may be mounted in alignment with and between the idler sprockets 44 and the discharge-end sprockets 36

(Fig. 4) to aid in maintaining the log-gripping members 40 in engagement with the log.

Referring to Fig. 3, the idler sprockets 36 and 44 and the support rollers 46 are each shown mounted on a tube 48 rotatably mounted on a shaft 50 having its opposite ends threaded in the plates 30. The driving sprockets 34, on the other hand, are keyed to a drive shaft 52 and held in spaced relation by a tube 54. The feed conveyor mechanism is bolted to the outer end of the arm 22 having its hub end 56 pivotally connected to the frame 10 on a roller bearing 58 the inner race 60 of which is clamped between a pair of members 62 and 64 bolted to the frame. The outer side of the hub 56 is mounted on a pivot 66 supported on a frame extension 68 to steady the arm 22 on the roller bearing 58.

The engaged gear segments 28 on the hubs 56 of the arms 22 insure that the rollers move equally and oppositely from the center of the log-debarking mechanism thereby maintaining the log centralized in the debarking mechanism.

The driving connection between the motor 12 and the feed conveyor 20 includes the drive shaft 52 extending through the arm 22 and terminating in a bevelled gear 70 housed within the hub 56 and engaging a similar gear 72 on a driven jack shaft 74 located at right angles to the shaft 52. Keyed to the jack shaft 74 is a driven gear or worm wheel 76 geared to a driving gear or worm 78 on a shaft 80 connected through the shaft connection 82 to be rotated by the motor 12.

The jack shaft 74 extends beyond the worm wheel 76 and has mounted on that end a beveled gear 72' for engagement with beveled gear 70' of the driving connection for the upper discharge feed conveyor. The driving connection for the two feed conveyors are identical in all respects except that the beveled gear 70' is on the reverse side of the gear 72' relative to the gears 70 and 72 so as to obtain rotation of the discharge feed conveyor in the same direction as the rotation of the inlet feed conveyor.

The driving connection for the lower inlet and discharge feed conveyors is identical to that of the driving connections just described and accordingly are not shown or described. It is noted, however, that the worm wheel for the lower feed conveyor corresponding to the worm wheel 76 is located on the opposite side of the worm 78 from the worm wheel 76 thereby obtaining rotation of the lower feed conveyors in the proper direction.

The driving connection for rotating the debarking mechanism includes a beveled gear 84 mounted on the end of the worm shaft 80 and engaging a beveled gear 86 on a shaft 88 supported on the frame 10 and having a belt pulley 90 keyed to its opposite end. The particular drive shown for the debarking mechanism is of the V-belt type and accordingly the generally tubularly shaped debarking frame 16 includes a series of three parallel V-shaped peripheral grooves 92 for receiving belts 94 partially encircling the frame 16 and fitted in the grooves of the pulley 90. It will be noted that there are additionally two more peripheral grooves 96 in the frame 16. Four rollers 98 mounted on the frame 10 at equal intervals around the frame 16 are fitted in these grooves to support the frame 16 for rotation and to prevent endwise movement of the frame.

The frame 16 includes an interior annular flange 100 on which are pivotally mounted in spaced relation therearound, the debarking cutters 18. The cutters shown are in the form of arms 102 extending generally radially inward from their pivots 104 and having curved cutter points 106 bolted thereto and adapted to strip the bark from logs passing through the debarking mechanism. Extending radially outward from the pivot 104 is a stub arm 108 on which are bolted heavy centrifugal weights 110.

It will be noted that the weights 110 are roughly oblong in shape with their principal axes located substantially tangent to a circle having its center at the center of rotation of the debarking mechanism, and additionally are located at least partially to one side of the longitudinal axis of the arms 102. This particular construction has at least two advantages. First a weight of considerable size may be used without materially increasing the overall outside diameter of the debarking mechanism. Secondly with this weight position, when the machine is not operating, at least some of the cutters are in an unbalanced condition tending to move the cutter points 106 out of engagement with the log. For example in Fig. 2 the topmost cutter and the next two cutters in the clockwise direction would move out of engagement with the log if the debarking mechanism were stopped in the position shown. This is considered to be a desirable advantage in that in the event of binding of the log in the debarking machine, merely halting the machine operation will result in at least partial release of the log. A conventional hydraulic jack 89 is mounted on each lower arm 22 with its head 91 engaging the upper arm 22 so that the arms may be forced apart to release a log in the event of jamming of a log being debarked.

In operation, starting of the motor 12 will simultaneously start rotation of the feed conveyors 20 and of the debariking mechanism 14. A log placed on the lower inlet feed conveyor 20 will result in the two conveyors climbing over the end of and onto the log thereby forcing the conveyors apart, due to the inclined section of the feed conveyors, to properly center the log relative to the debarking mechanism. This centering is due also to the gear connection 28 between the arms 22 and to the curved shape of the log-gripping members 40. It is to be noted that the arms 22 are of sufficient length and pivot at a point displaced from the center of rotation of the debarking mechanism 14 such that movement of the arms 22 about their pivots moves the center of each conveyor 20 only slightly off center of the center of rotation of the debarking mechanism 14.

When the cutter points 106 contact the end of the log being fed into the debarking mechanism, they will spiral out to the periphery of the log to strip the bark therefrom. The points are held in cutting engagement with the log by the centrifugal force of the weights 110 tending constantly to pivot the cutter arms 102 about the pivots 104 in a direction to move the points 106 toward the center of rotation of the debarking mechanism 14.

I claim:

1. A log debarking device comprising a frame, a debarking mechanism mounted on the frame and adapted to strip bark from a log fed therethrough, a pair of arms pivotally mounted on the frame, each arm having a feed conveyor on the corresponding ends with the feed conveyors positioned relative to each other for receiving therebetween and guiding a log to be debarked, at least one of said feed conveyors having a driving connection adapted to be driven by a motor to drive the connected conveyor for feeding the log into said debarking mechanism, said feed conveyor including a roughly oblong side view shaped endless feed belt having its principal axis located to provide a relatively long log contacting length, said length being maintained substantially parallel to the path of movement of the log, means connected to constantly urge said arms toward each other to firmly grip a log between said conveyors, means connecting each pair of arms such that pivotal movement of one arm is transmitted to the other such that the center of the log is maintained relatively constant with relation to the debarking mechanism.

2. A drive for a feeding device having a pair of pivotally mounted arms with a feed conveyor mounted on the end of each arm, comprising a motor rotated shaft, a driving gear thereon, a driven gear engaged for rotation by the driving gear, a driven shaft connected to be rotated by the driven gear and having a gear at an end portion thereof, a feed conveyor drive shaft connected at one end to rotate one of said feed conveyors and having a gear at its opposite end portion engaged to be driven by the last said gear, and a second driving connection for the other of said conveyors including the elements identical to the aforesaid driven gear, driven shaft and associated gear and feed conveyor driving shaft and associated gear connected and arranged in the manner aforesaid.

3. The drive claimed in claim 2 in which the gear connected at an end portion of the driven shaft is located at the pivot of the arm and the conveyor driving shaft engaged thereto is mounted with its axis coaxial with the axis of the arm.

4. A log debarking device as claimed in claim 1 in which the pivots for the pivotally mounted arms are parallel to the path of movement of the log.

5. A drive as claimed in claim 2 in which the motor rotated shaft has a second driven gear thereon at the end thereof, a driven gear carried by a short driven shaft is engaged by said second driving gear, a pulley mounted on said driven shaft, and a series of belts encircling said pulley and adapted to drive a log debarking device.

References Cited in the file of this patent

UNITED STATES PATENTS

| | | |
|---|---|---|
| 327,730 | Sims | Oct. 6, 1885 |
| 427,987 | Hamon | May 13, 1890 |
| 1,704,419 | Ackley | Mar. 5, 1929 |
| 1,746,697 | Eaglesfield | Feb. 11, 1930 |
| 2,374,429 | Hayes et al. | Apr. 24, 1945 |
| 2,625,968 | Eklund et al. | Jan. 20, 1953 |
| 2,655,961 | McComb | Oct. 20, 1953 |
| 2,692,623 | Leffler | Oct. 26, 1954 |
| 2,694,425 | Skoglund | Nov. 16, 1954 |
| 2,718,910 | St. Clair | Sept. 27, 1955 |
| 2,774,397 | Leffler | Dec. 18, 1956 |
| 2,785,715 | Brundell et al. | Mar. 19, 1957 |
| 2,794,466 | Leffler | June 2, 1957 |
| 2,815,776 | Annis et al. | Dev. 10, 1957 |
| 2,821,220 | Nicholson | Jan. 28, 1958 |

FOREIGN PATENTS

| | | |
|---|---|---|
| 24,258 | Sweden | Feb. 29, 1908 |